Jan. 8, 1924.
E. R. HUNTLEY
SPEEDOMETER
Filed Jan. 2, 1919
1,480,073
4 Sheets-Sheet 1
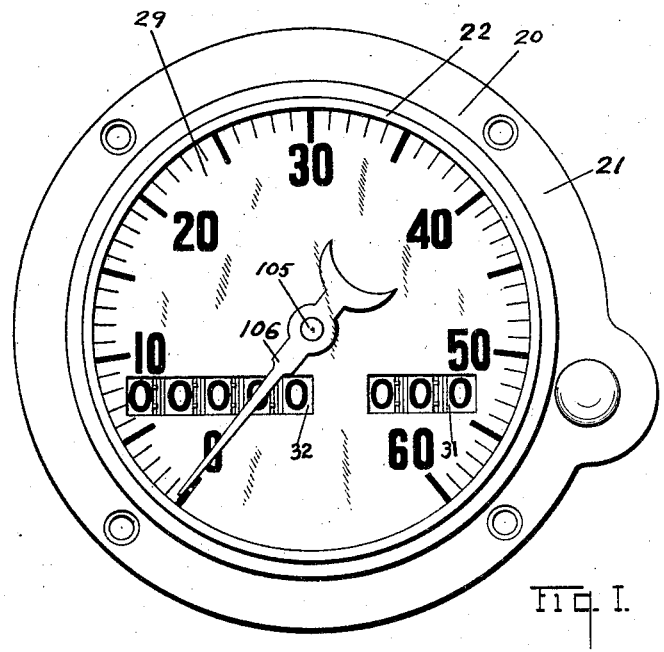
Fig. I.
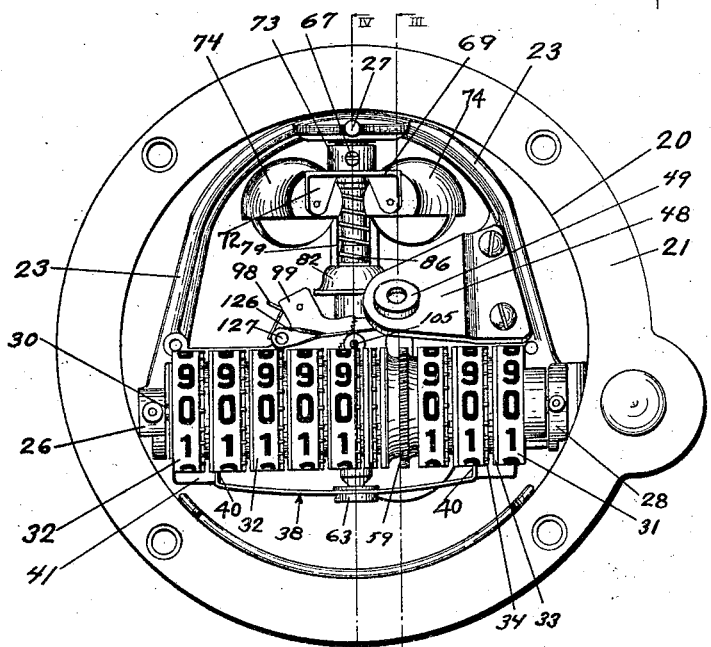
Fig. II.
INVENTOR.
Ernest R. Huntley
BY
ATTORNEY Jan. 8, 1924.  1,480,073
E. R. HUNTLEY
SPEEDOMETER
Filed Jan. 2, 1919   4 Sheets-Sheet 2
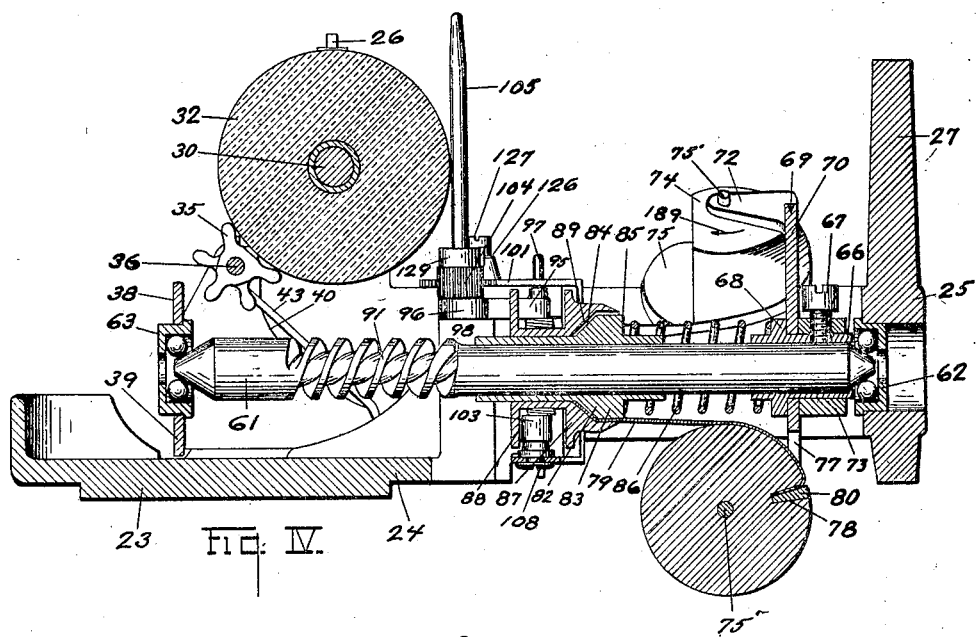
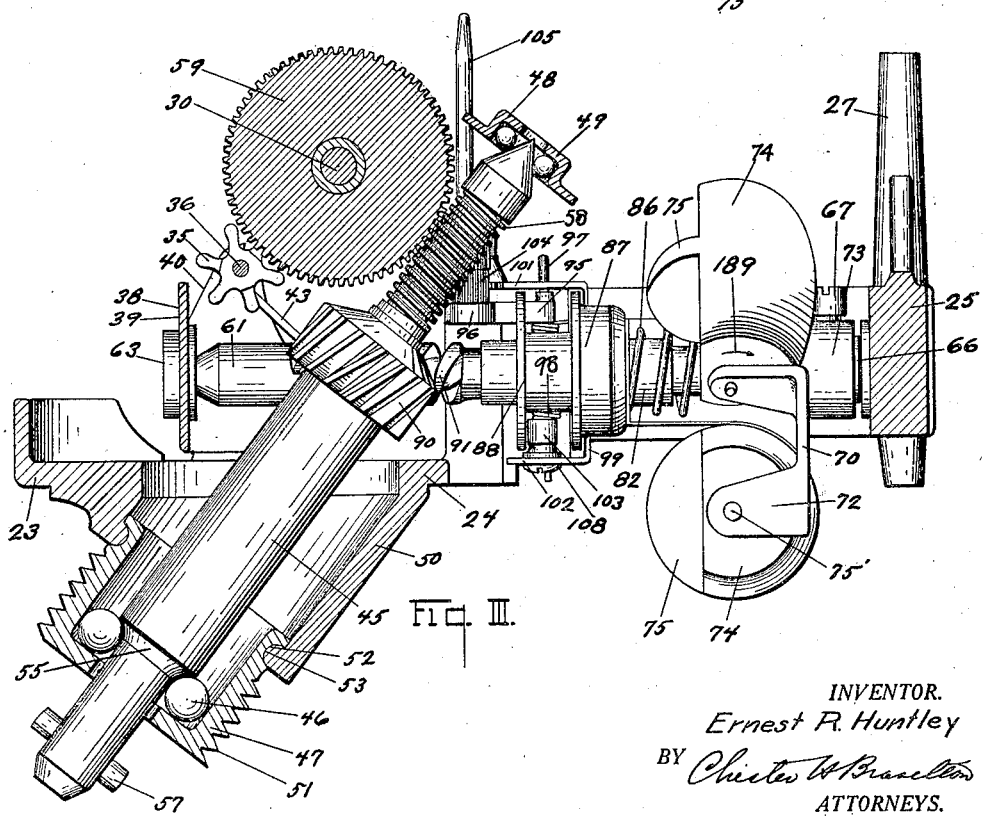
INVENTOR.
Ernest R. Huntley
BY
ATTORNEYS.

Jan. 8, 1924.
E. R. HUNTLEY
SPEEDOMETER
Filed Jan. 2, 1919
1,480,073
4 Sheets-Sheet 3
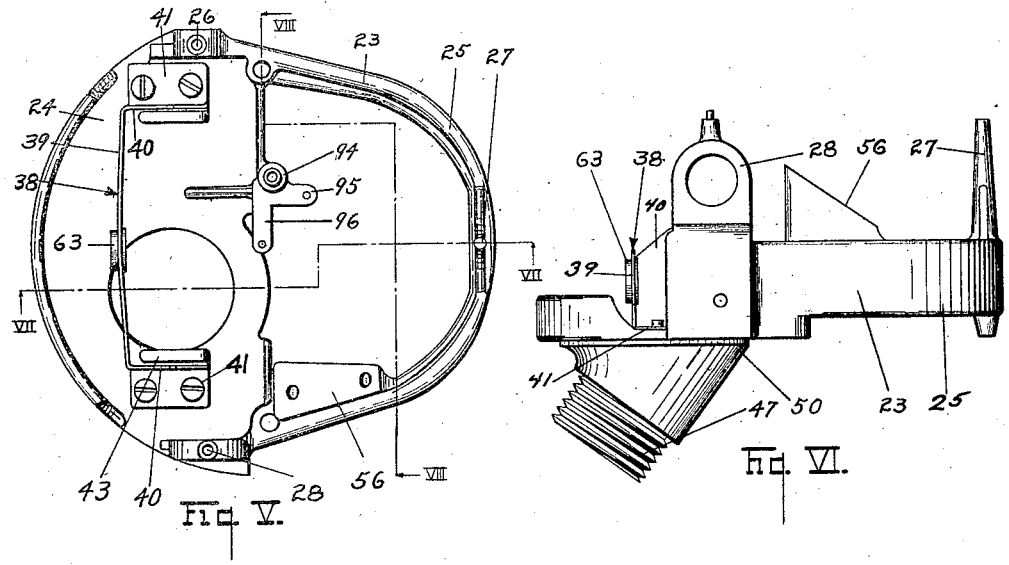
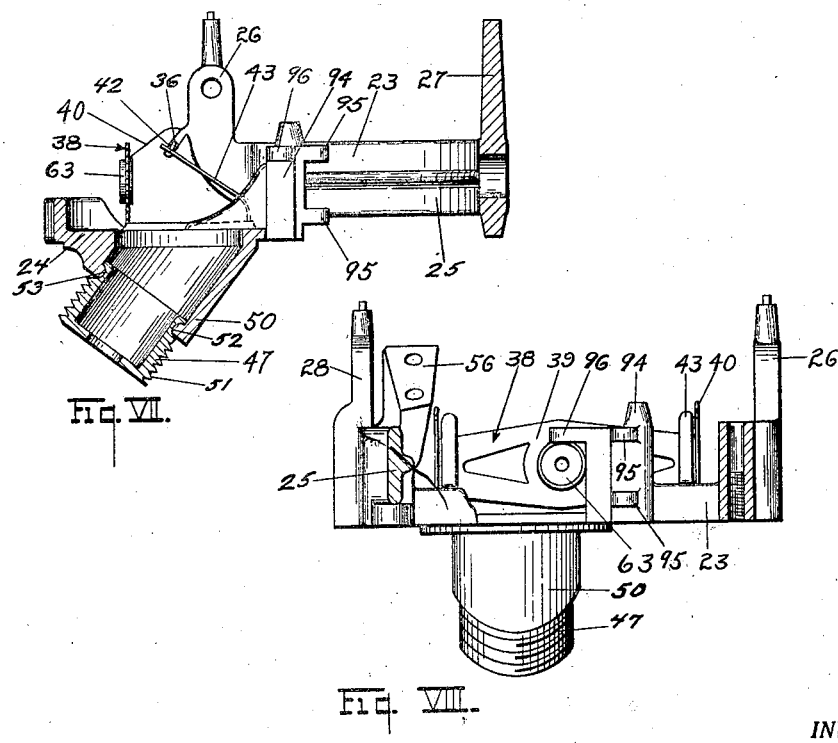
INVENTOR.
Ernest R. Huntley
BY Chester N Broselton
ATTORNEY Jan. 8, 1924.
E. R. HUNTLEY
1,480,073
SPEEDOMETER
Filed Jan. 2, 1919   4 Sheets-Sheet 4
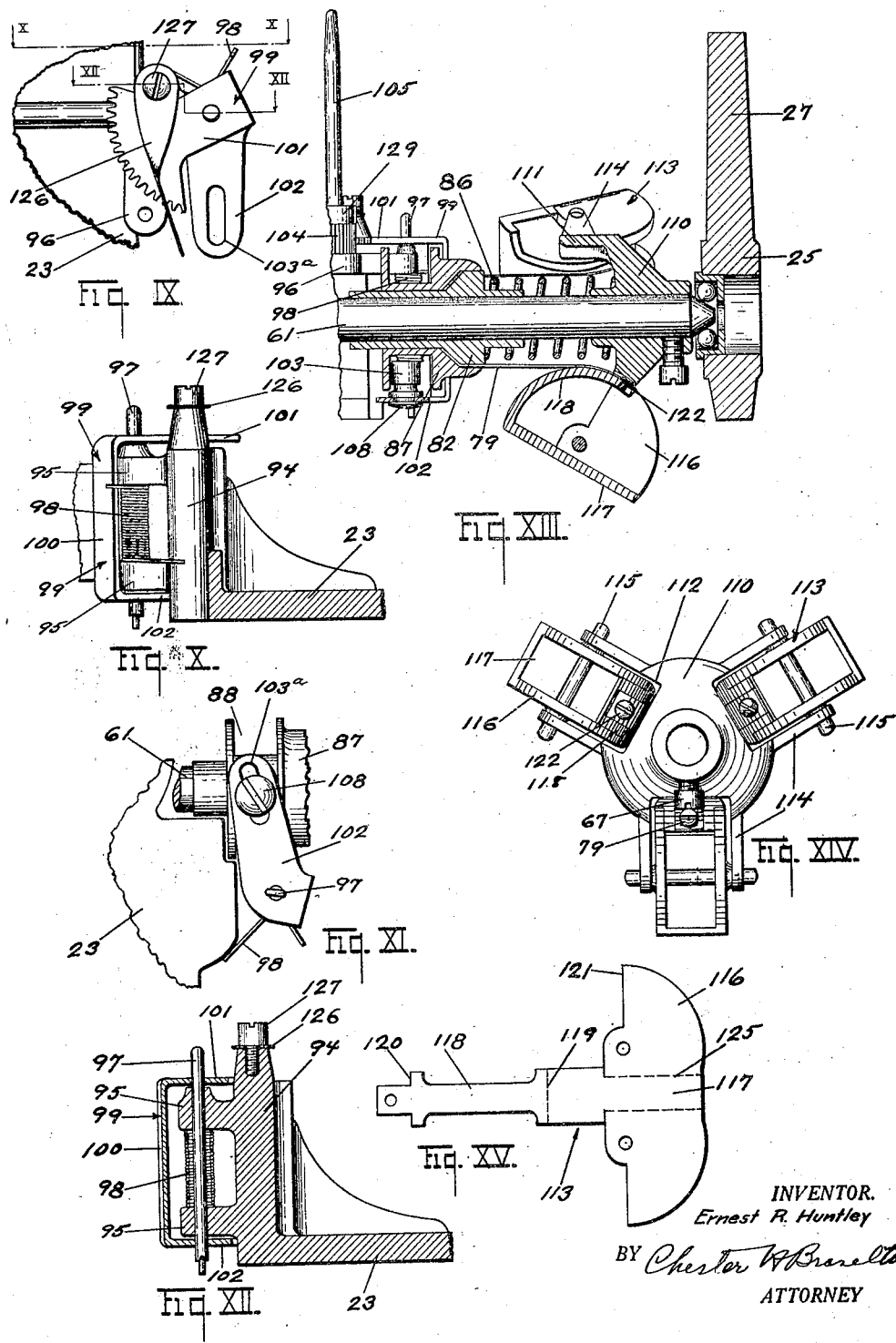
INVENTOR.
Ernest R. Huntley
BY Chester W Braselton
ATTORNEY Patented Jan. 8, 1924.

1,480,073

UNITED STATES PATENT OFFICE.

ERNEST R. HUNTLEY, OF TOLEDO, OHIO, ASSIGNOR, BY MESNE ASSIGNMENTS, TO INDUSTRIAL RESEARCH CORPORATION, OF TOLEDO, OHIO, A CORPORATION OF DELAWARE.

SPEEDOMETER.

Application filed January 2, 1919. Serial No. 269,339.

*To all whom it may concern:*

Be it known that I, ERNEST R. HUNTLEY, residing at Toledo, county of Lucas, State of Ohio, have invented certain new and useful Improvements in Speedometers, of which I declare the following to be a full, clear, and exact description.

This invention relates to combined speedometer and odometers, commonly known as speedometers.

The principal object of this invention is to provide certain improvements in the construction, form and arrangement of the several parts of the speed indicator and operating means whereby the mechanism will be simplified, its efficiency, durability and reliability increased and its cost of manufacture reduced.

Another object of the invention is to provide novel means for mounting the operating shaft which is provided with worm gears for actuating the governor shaft of the speed indicator mechanism and the registering wheels of the odometer.

Another object of the invention is to provide novel operating mechanism for the speed indicator hand.

A further object of the invention is to cast the supporting frame about a hardened bearing cup for the operating shaft, so that a ridge on the frame projects into a groove in the cup to fasten the cups to the frame.

With these and incidental objects in view the invention consists in certain novel features of invention and combination of parts, the essential elements of which are set forth in the appended claims and a preferred form of embodiment of which is hereinafter described with reference to the drawings which accompany and form part of this specification.

In the drawings Figure I is a front view of the speedometer embodying the present invention.

Figure II is a front view of the speedometer with the glass front, the speed indicator hand and the dial removed.

Figure III is a detail cross-sectional view, taken substantially on the line III—III of Fig. II.

Figure IV is a detail sectional view, through the speed governor, the section being taken substantially on the line IV—IV of Figure II.

Figure V is a plan view of the frame carrying the various mechanisms.

Figure VI is a side elevation of the frame shown in Figure V.

Figure VII is a detail cross-sectional view through the frame, the sections being taken substantially on the line VII—VII of Figure V.

Figure VIII is a cross-sectional view through the frame, the section being taken as on the line VIII—VIII of Figure V.

Figure IX is a detail plan view of a portion of the operating mechanism for the speed indicator hand.

Figure X is a detail sectional view, taken substantially on the line X—X of Figure IX.

Figure XI is a detail rear view of part of the operating mechanism for the speed indicator hand.

Figure XII is a detail section, taken substantially on the line XII—XII of Figure IX.

Figure XIII is a longitudinal section taken through a speed governor of modified form.

Figure XIV is a detail end view of the governor, shown in Figure XIII.

Figure XV is a detail view showing a blank which is bent to form one of the weight members of the governor shown in Figures XIII and XIV.

Referring to Figs. I and II of the drawing, the speedometer is mounted in a casing 20 having a flange 21 by which it is secured to the instrument board or other suitable part of the vehicle. A glass or other transparent front is carried in a ring 22 positioned in any desired manner in the front opening of the casing so that the registrations on the speed indicating mechanism and odometer may be viewed.

A supporting frame 23 (Figures II, V, VI, VII and VIII) is of skeleton form and comprises a plate portion 24 and an integral curved portion 25. Projecting from this frame are three integral arms 26, 27 and 28 on the outer ends of which is mounted the indicating dial 29 (Fig. I) having on its face the usual speed graduated scale.

Mounted on a rod 30 (Figs. II and III) supported by the arms 26 and 28, are the registering wheels 31 of the trip register, and the registering wheels 32 of the total register, the numerals on the peripheries of these wheels being viewed through the usual sight openings in the dial 29 as shown in (Fig. I). The construction of these wheels and the operating connections to the units wheel of each register is more fully shown and described in co-pending application, Serial No. 269,879, filed January 6, 1919, and reference may be had thereto if desired.

Secured to the left hand side of each registering wheel 31 and 32 is the usual notched disc 33 and secured to the right hand side is the usual gear 34 (Fig. II). Co-operating with each disc 33 of one registering wheel and the gear 34 of the registering wheel of the next higher order is a transfer pinion 35 loosely mounted on a rod 36. As is well known in the art, the pinions 35 are provided with alternate long and short teeth so that as one registering wheel passes from "9" to "0" the notch in its disc 33 co-operates with a long tooth on the corresponding pinion 35 and thereby rotates this pinion 35, which in turn rotates the gear 34 and registering wheel of next higher order to advance the latter one unit.

It has been found in practice that in some instances, due to slight variations in manufacture and non-alignment of the parts in operation, there is a tendency for the transfer pinion 35 to bind or possibly lock with the corresponding gears 34 and discs 33 during transferring operations, with the result that these operations are not smooth and easy and possibly the teeth become worn or break. In order to eliminate this difficulty and overcome the friction resulting therefrom, the rod 36 is resiliently mounted to move bodily and slightly away from the registering wheels when one or more of the transfer pinions tends to bind with the corresponding gears and discs on the registering wheels. To this end a plate or member 38 of flexible metal is formed with a central portion 39 (Figures V, VII and VIII) and end portions 40 bent at right angles to the central portion 39. The portions 40 have radially extending flanges 41 forming bases by which the member 38 is mounted on the frame 23 by means of screws as shown in Figure V. The end portions 40 of the member 38 are provided with slots 42 (Figure VII) in which the ends of the shaft 36 are positioned. Integral with each end portion 40 and to one side thereof is a spring finger 43, which is connected at its lower end to the portion 40 and is free at its upper end. The member 38 is cut or stamped from a plate of sheet metal and then the member is bent to form the end portions 40, the bases 41 and the fingers 43. As shown in Figure VII, the fingers 43 engage the rod 36, so that the fingers, together with the lower sides of the slots 42, support the rod 36.

From the above description it can be seen that the fingers 43, which act as leaf springs, support the rod 36 in the grooves 42, and that when there is any imperfect action between the transfer pinions 35 and the discs 33 and the gears 34, while transfers are being effected, the rod 36 is moved slightly outwardly from the registering wheels against the action of the spring fingers which, after the transfer is effected, or the imperfect action is passed, moves the rod and transfer pinions to their normal position, the transmission pinions being retained in engagement with the gears 34 at all times.

The indicating mechanism and odometer are operated by an operating shaft 45 (Fig. III). This shaft, which is arranged obliquely to the plane of the frame 23, is supported at one end by ball bearings 46 mounted in a bearing cup 47, and the opposite end of the shaft is supported by ball bearings 48 mounted in a bearing plate 49. The bearing cup 47 is mounted in one end of a tubular extension 50 of the frame 23, the cup being secured in the extension 50 by means of an internal circumferential rib 52 on the extension 50 projecting into the groove 53 in the cup, which is also provided with screw threads 51 for attaching the end of the usual casing hose for the flexible shaft (not shown) rotated by one of the moving parts of the vehicle. The frame 23 is cast in a mold in which the cup 47, which is hardened, is positioned so that the rib 52 is formed in the groove 53 during the casting of the frame 23. The ball bearings 46 engage the bearing surface 55 on the shaft to support the same. The bearing plate 49 (Figures II and III) is mounted on a projection 56 (Figures VI and VIII) integral with the frame 23.

The lower end of the shaft 45 (Figure III) is provided with a pin 57 adapted for connection with one end of the flexible shaft driven by a moving part of the vehicle as stated above.

Screw threads 58 formed on the upper end of the shaft 45 mesh with the teeth of a worm gear 59 which actuates the registering wheels of the odometer as fully described in the aforesaid pending application. It can be seen that as shaft 45 is securely supported at its opposite ends by anti-friction bearings, that the screw threads 58 are firmly retained in mesh with the teeth of the worm gear 59.

The governor shaft 61 (Figure IV) has conical ends and its right hand end is supported by ball bearings mounted in a bearing cup 62 supported in an opening in the frame 23. The left hand end of the shaft is supported by ball bearings mounted in a bearing cup 63 which is positioned in an opening in the center of the central portion 39 of the member 38 (Figures V and VIII). The portion 39 of the member 38 is flexible and the member 38 is so mounted in respect to the shaft 61 that the portion 39 is slightly bowed to press the bearings firmly against the end of the shaft. It is obvious that with this form of supporting means the wear of the shaft at the bearings is automatically taken care of as the portion 39 is constantly tending to straighten out. This form of mounting prevents the shaft from becoming loose in the bearings and therefore eliminates all noise which would accompany such looseness.

The governor mounted on the shaft 61 is of novel construction and will now be described. Mounted on the shaft 61, near its right hand end, as viewed in Figure IV, is a collar 66 rigidly secured to the shaft by a screw 67. The collar 66 is provided with a flange 68 and secured on the collar 66 is a frame 69 consisting of a plate portion 70 having three pairs of laterally extending arms 72. The screw 67 retains a collar 73 on the sleeve 66 and the plate portion 70 is gripped firmly between the flange 68 and the end of the collar 73 so that the frame 69 rotates with the collars and shaft 61. Mounted between each pair of arms is a barrel shaped weight 74 which is cut away on one side of its axis the cutaway portions leaving a circular projection 75. Each weight 74 is supported on a rod 75' projecting axially through its center, the ends of the rod being loosely mounted in the arms 72 of the corresponding pair to permit rotation of the weight about its geometric axis. The plate portions 70 are cut away as 77 (Fig. IV) to accommodate the weights. A groove 78 is cut in each weight and one end of a ribbon 79, which is formed of flexible metal or other suitable material, is fastened in the groove by means of a wedge 80.

A sleeve 82 is loose on the shaft 61 and is enlarged at 83 to provide a conical surface 84 on one side and a shoulder 85 on the other. A coiled spring 86 is compressed between the shoulder 85 of the sleeve 82 and the lateral flange 68 of the sleeve 66, and hence tends to move the sleeve 82 axially toward the left. Fast on the sleeve 82 is a collar 87 provided with an annular groove 88 and an enlarged opening in its righthand end to form an interior conical surface 89. The left-hand ends of the ribbons 79 are firmly gripped between the conical surfaces 84 and 89 of the collar 82 and sleeve 87 respectively to fasten these ends of the ribbons to the sleeve 82.

Fast on the shaft 45 is a worm gear 90 meshing with a worm 91 cut in the governor shaft 61 so that the shaft 45 rotates the governor shaft.

From the above description it can be seen that as each barrel weight 74 is cut away on one side, the opposite side is heavier and therefore when the frame 69 is rotated, the weights 74 rotate as the centrifugal action causes the weights to move outwardly from the shaft 61. Normally, when the shaft 61 is not rotating the spring 86 retains the sleeve 82 in the position shown in Figs. III and IV and through the ribbons 79, which are flexible, cause the weights 74 to assume the normal position shown in these figures. The ribbons 79 are sufficiently stiff to prevent the weights from rotating in the direction of the arrow 189 past normal position. When the shaft 61 is rotated the weights 74 rotate about their axis because of the centrifugal action and move the sleeve 82 toward the right against the action of the spring 86, the extent of movement of the sleeve 82 being dependent upon the speed of rotation.

The frame 23 is provided with an arm 94 having two laterally extending and aligned lugs 95 and one laterally extending lug 96, (Figs. V, VII and X). Projecting through the lugs 95 is a pin 97 and between the lugs 95 is a spring 98. Mounted on the pin 97 is a U-shaped operating member 99 comprising a central portion 100, an arm 101 (Fig. IX) forming a segmental gear and an arm 102 provided with a slot 103$^a$. One end of the spring 98 engages the portion 100 and the other end engages the arm 94 thereby normally retaining one edge of the arm 101 in engagement with the arm 94. Mounted on the arm 102 of the member 99 is a stud 103 (Figs. III and IV) projecting into the groove 88 in the sleeve 87. The teeth on the segmental arm 101 mesh with a pinion 104 fast on a shaft 105 which at its upper end carries the indicating hand 106 (Fig. I), the lower end of the shaft 105 being mounted for rotation in an opening in the lug 96 on the arm 94 of the frame 23.

From this description it can be seen that movement of the sleeve 87 by the governor rotates the member 99 to corresponding extents as the stud 103 extends into the groove 88 in the sleeve 87. This rotation of the member 99 is communicated to the indicating hand through the segmental arm 101, gear 104 and shaft 105, so that the indicating hand is moved over the scale on the dial to indicate the speed of the vehicle.

As shown in (Figs. IV and XI) the stud 103 is secured on the arm 102 by a screw 108 which projects through the slot 103$^a$ in the arm, the screw being adapted to be moved in the slot to make the proper adjustments and provide for wear.

Secured by a screw 127 (Figs. VI, IX and

XII) on the upper end of the arm 94 is a leaf spring 126 having its free end bent at right angles to its secured end to engage a disc 129, preferably of fibre, fast on the indicator shaft 105. The spring 126 presses against the disc 129 to steady the movement of the indicator hand 106, this being accomplished as the frictional contact of the spring with the shaft 105 prevents the shaft and hand from fluttering due to shocks and play in the operating parts.

In the modification of the speed governor shown in (Figs. XIII and XIV and XV) a frame 110 is fast on the governor shaft 61 and is provided with an axially extending flange III between which are openings 112 (Fig. XIV) to accommodate the weights 113. Projecting from each flange III is a pair of arms 114, a pin 115 being supported on the arms of each pair for carrying the weight 113. Each of these weights 113 is formed preferably from a sheet metal blank, (Fig. XV). The side portions 116 of the weights are bent on the lines 125 at right angles to the center portion 117 of the blank and then the arm portion 118 is bent approximately on the line 119 and curved as shown in (Fig. XIII). The shoulders 120 on the arm 118 engage the edges, indicated by the reference numeral 121, and the portion of the arm beyond the shoulders projects between the sides 116. The right hand ends of the ribbons 79 are secured by screws 122 to the end of the arm 118. The remainder of the governor mechanism shown in this modification is substantially the same as shown in the preferred form. It is obvious that the operation of this modified form is the same as that described in connection with the preferred form.

The construction and operation of the various mechanisms of the speedometer is clear from the above description.

While the form of mechanism herein shown and described is admirably adapted to fulfill the object primarily stated, it is to be understood that it is not intended to confine the invention to the preferred form of embodiment herein described, for it is susceptible of embodiment in various forms all coming within the scope of the claim which follows.

What I claim as new and desire to secure by Letters Patent is:

In a device of the class described, the combination with a frame, a governor mounted thereon, a sleeve moved by said governor, an indicator hand, a pinion connected to the indicator hand, a pair of spaced lugs upon the frame, a pin carried by said lugs, an actuating member for said pinion having a pair of arms pivoted upon said pin, one of said arms having teeth meshing with said pinion and the other being connected with said sleeve, and means yieldingly holding said actuating member in a predetermined position upon said lugs.

In testimony whereof, I affix my signature.

ERNEST R. HUNTLEY.